United States Patent [19]

Okuyama

[11] 4,238,996
[45] Dec. 16, 1980

[54] TWO-STAGED PRESSURE COOKER

[76] Inventor: Muneaki Okuyama, 60-13 Ohyama Higashicho, Itabashi Ku, Tokyo, Japan

[21] Appl. No.: 837,352

[22] Filed: Sep. 27, 1977

[51] Int. Cl.³ ............................................. A47J 37/12
[52] U.S. Cl. ................................. 99/352; 99/403; 99/450; 126/369; 219/440
[58] Field of Search ................ 99/450, 339, 352, 355, 99/403, 410, 411, 412, 413, 414, 415, 416, 417, 418, 467, 473, 475–476, 280, 292–294; 126/348, 369; 219/401, 386, 432, 433, 440, 441; 426/505, 510, 511; 220/210

[56] References Cited

U.S. PATENT DOCUMENTS

| | | | |
|---|---|---|---|
| 395,576 | 1/1889 | McIntire | 126/348 |
| 1,282,230 | 10/1918 | Hoddenbach | 99/339 |
| 1,678,543 | 7/1928 | Watson | 99/294 |
| 1,944,365 | 1/1934 | Patchell et al. | 126/369 |
| 1,958,590 | 5/1934 | Peirce | 126/369 X |
| 2,357,634 | 9/1944 | Crites | 219/440 |
| 2,427,564 | 9/1947 | Le Claire | 126/348 |
| 2,620,789 | 12/1952 | Gregory | 126/369 X |
| 2,654,501 | 10/1953 | Antonioli, Jr. et al. | 126/369 X |
| 2,948,620 | 8/1960 | Ashley | 99/352 X |
| 2,984,171 | 5/1961 | Lee, Sr. | 99/352 |
| 3,131,622 | 5/1964 | Rhyne | 219/440 X |
| 3,391,271 | 7/1968 | Campbell | 219/271 |

*Primary Examiner*—Harvey C. Hornsby
*Assistant Examiner*—Arthur O. Henderson
*Attorney, Agent, or Firm*—Wenderoth, Lind & Ponack

[57] ABSTRACT

A two-staged pressure cooker comprises an air-tight vessel having an upper-stage chamber for containing foods to be pressure-cooked and a lower-stage chamber for containing water. The two chambers are separated from each other, each having a pressure-actuated regulating valve which allows the chamber to be maintained under an appropriate pressure for cooking. Foods can be placed in both chambers for pressure cooking.

9 Claims, 4 Drawing Figures

TWO-STAGED PRESSURE COOKER

BACKGROUND OF THE INVENTION

1. Field of the Invention

The present invention relates generally to a cooking utensil, and more particularly to a two-staged pressure cooker for both home and commercial cooking uses comprising an upper steam-filled chamber for containing foods to be cooked and a lower chamber for containing water.

2. Description of the Prior Art

Conventional pressure cookers which are known in the art are mainly intended for and developed to include improvements on the pressure valves, airtightness, durability, safety, etc., and comprise a single or one-stage chamber, in which water and foods coexist and are cooked under pressure. For pressure-cooking a mixture of water and foods such as unhulled or unpolished rice, Taiwan-origin rice, American origin rice and the like in the single chamber according to the known pressure cookers, it is necessary to be very careful about the amount of water to be used and the temperature of heat to be applied. Otherwise, as it is very often encountered, foods thus cooked tend to burn easily or become very sticky. If it is desired that foods be cooked under pressure to give them a flavor which contains flavoring ingredients extracted by boiling Chinese medicine materials, wine, aromatic materials, deodorants and the like, the foods and aromatic substances must be processed in the same space under an identical steam pressure. In other words, those different kinds of substances cannot be placed under their respective adequate pressures with the result that it is disadvantageously impossible to cook the foods with a good taste or flavor.

SUMMARY OF THE INVENTION

Having the problems and disadvantages of the prior art mentioned above in mind, it is accordingly one object of the present invention to provide a two-staged pressure cooker which comprises an airtight vessel having an upper chamber for containing foods to be cooked such as unhulled rice, Taiwan-origin rice, meats, sea foods including fishes and shellfishes and the like, and a lower chamber for containing water which contains seasonings such as wine, Chinese medicines and the like, whereby the two chambers can be maintained under respective adequate steam pressures with the upper chamber supplied with an appropriate amount of steam so that the foods can be cooked without attending to the amount of water to be used and the intensity of heat to be applied, and the thus-cooked foods are not sticky and have no trace of being burned.

It is another object of the present invention to provide a two-staged pressure cooker to be used for both home cooking and commercial cooking purposes, in which foods of hard nature such as unhulled rice can be cooked simply by boiling water in the lower chamber with no particular regard to the amount thereof and the intensity of heating.

It is still another object of the present invention to provide a two-staged pressure cooker which include replaceable pressure valves for the upper and lower chambers and thus allows for a wider range of cooking.

It is a further object of the present invention to provide a two-staged pressure cooker of a simple construction which permits easy manufacturing and assembly and easy operation.

Other objects, features and advantages of the present invention will become apparent from the following description of the specification and the appended claims by reference to the accompanying drawings.

DESCRIPTION OF THE PREFERRED EMBODIMENTS

Figure 1:
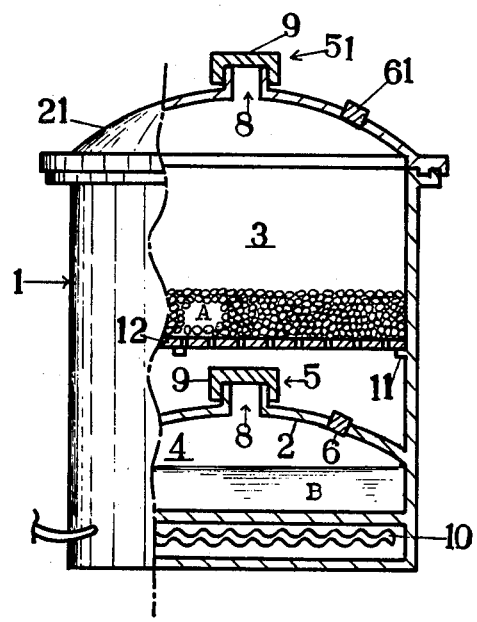
FIG. 1 is a front view, partly broken away, of a preferred embodiment of the two-staged pressure cooker according to the present invention.

Referring now to the accompanying drawings, the present invention will be illustrated in detail by showing several preferred embodiments thereof. As particularly shown in FIG. 1, the pressure cooker according to the invention comprises a vessel 1 having therein an inner cover 2 which separates the space inside into an upper stage and a lower stage, the upper stage for a steam-filled chamber 3 and the lower stage for a water holding chamber 4. The upper chamber 3 has a hinged lid 21 which keeps the vessel airtight when it is clamped down. The lid 21 has a pressure-actuated regulator valve 51 and a safety relief valve 61. The inner cover has also a pressure-actuated regulator valve 5 and a safety relief valve 6. The pressure valves 51 and 5 will be described in detail later. Below the water holding chamber 4 is a heat source 10 such as for example an electrically heated filament or a gas burner. The inner cover 2 separating the interior of the vessel 1 into the two chambers 3 and 4 has a saucer shape as shown and is secured to the inner wall of the vessel 1. In an alternative form shown in FIG. 2, the cover is in the form of a cup-shaped container 41 and may be removably mounted in position by a suitable supporting means. In the two forms, the cover 2 which is placed in position for defining and enclosing the chamber 4 can keep the chamber 4 airtight.

Figure 2:
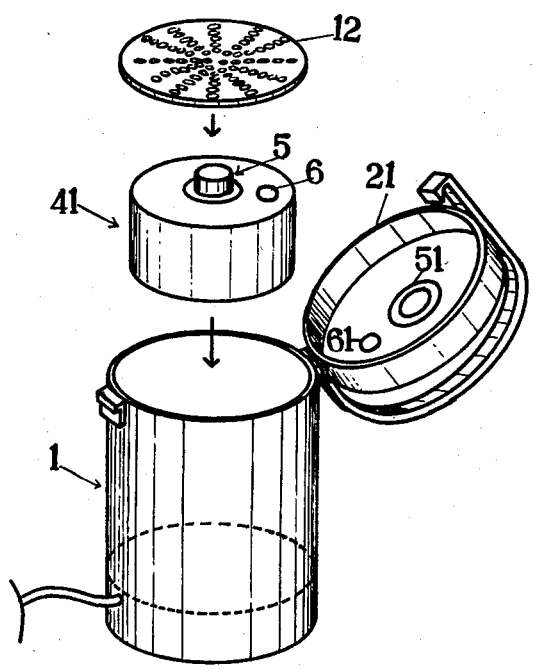
FIG. 2 is a perspective view of another preferred embodiment, illustrating the component parts thereof as disassembled for better comprehension of the construction which permits easy manufacture or assembly and easy maintenance service such as cleaning.

In the embodiment shown in FIG. 1, the pressure valve 5 referred to earlier provided at the upper center of the cover 2 is constructed such that a weight 9 is freely or floatably fitted around a steam outlet 8 having a wall extending upwardly at the center of the cover 2. The weight 9 has a cup shape covering the steam passage 8, and is of a weight which allows the weight 9 to be pushed up by a steam pressure inside the chamber 4 which builds up to about 1.2 to 1.5 kg of atmospheric when water is heated and boiled. As readily understood, the weight 9 is caused to be floating at the pressures of 1.2 to 1.5 kg so that it can allow excess steam to escape through the outlet 8 or the gap defined between the floating weight 9 and the outlet 8. Below the predetermined pressures, on the other hand, the weight 9 closes the outlet 8 so that steam can be confined in the chamber 4. As shown in FIGS. 1 and 2, the inner cover 2 or container 41 includes a safety relief valve 6 which is automatically operated to vent the pressure before the pressure inside the chamber 4 can build up to a certain explosive level so that any danger due to an abnormally excessive pressure can be avoided. As described earlier, the vessel 1 has at the bottom thereof or below the chamber 4 a heating source 10 such as a gas burner or electrically-heated filament.

Figure 3:
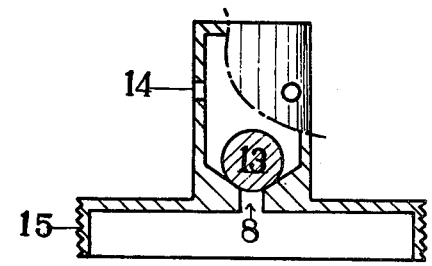
FIGS. 3 and 4 are front views, partly broken away, of examples of the pressure-actuated regulating valve for use in the pressure cooker as embodied by the present invention.
Figure 4:
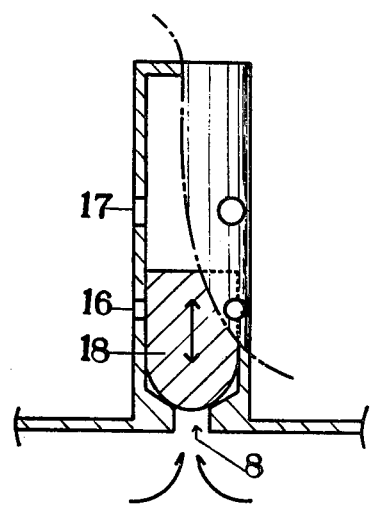

As particularly shown in FIG. 1, the upper chamber 3 has a space confined by the inner cover 2 below, and includes a separate apertured or grilled plate 12 which is removably placed on a projection 11 provided circumferentially of the inner wall of the vessel 1. At the open top of the vessel 1 is the earlier-mentioned lid 21 which is hinged and keeps the chamber 3 of vessel 1 airtight when it is clamped down. The lid 21 has a pressure-actuated regulator valve 51 and a safety relief valve 61, valves 51 and 61 having functions similar to those of the inner cover 2. It should be noted that both valves are replaceable depending upon the kind of foods to be cooked, and are selected so that they may provide appropriate pressures for the particular purposes. The valves 5 and 51 to be used may be of the per se known type, and may also be of the type shown in FIGS. 3 and 4. The valve construction shown in FIG. 3 includes a spherical valve 13 floatably disposed over a steam inlet opening 8 in a top-closed casing. The casing has a plurality of apertures 14 through which steam can be jetted out, and has the base portion externally threaded at 15 for engagement with the steam outlet opening of the lid 21 or cover 2. This allows for replacement of the pressure valves for different functions depending on the kind of foods to be cooked. In this way, appropriate steam pressures can be provided accordingly. The valve construction shown in FIG. 4 has an elongated cylindrical casing which is top-closed and has a plurality of upper and lower apertures 16 and 17. A valve 18 has a conical or piston shape fitted inside the casing for sliding movement so that it can open and close the steam passage at 8. This valve construction in FIG. 4 may conveniently be used as a safety valve function as well.

A varied form of the pressure cooker of FIG. 1 is shown in FIG. 2, which has a simple construction for the convenience of ease of manufacturing and assembly. As shown in FIG. 2, the water holding chamber 4 has the form of independent or separate container 41 which permits easy cleaning. The container 41 may also be used as an independent pressure saucepan. In this varied form, the apertured plate 12 may be placed on a projection 11 around the inner wall of the vessel 1 or on other similar supporting means. Other similar supports may include a gripe (not shown) of the container 41 on which the plate 12 is placed in position.

In accordance with the construction of the pressure cooker illustrated heretofore, the operation and manner of usage of the cooker will now be described. Food A to be cooked such as unhulled rice is placed on the plate 12 in the upper chamber 3 while water B is poured in the chamber 4. In some cases, water B contains aromatic or seasoning substances such as wine for giving the food A a flavor. The heater source 10 such as a gas burner is turned on and heats the water B to a boiling point. At the boiling point, the water B evaporates, providing steam pressure which builds up in the chamber 4. Then, the aromatic substances in the water B are processed while the increased steam pressure causes the valve 5 to be operated for opening the passage to the upper chamber 3 so that steam containing aromatic ingredients is allowed to pass through the valve 5 into the chamber 3. Thus, the steam through the valve 5 gradually bills the chamber 3. At this time, the temperature inside the chamber 4 rises to the range of between 120° C. and 140° C. at an atmospheric pressure of from 1.2 to 1.7 kg inside, while the temperature inside the chamber 3 rises to 120° C. to 140° C. with an atmospheric pressure of 1.2 to 1.5 kg. The food A is allowed to be boiled under the above conditions for several minutes, and in the case of the unhulled rice, it has then been cooked almost 80%. Thereafter, the steam pressure within the chamber 3 soon causes the valve 51 on the lid 21 to be operated for allowing steam to go out therethrough into the atmosphere. If a timer not shown is previously set to a heating period of time, it is then actuated at the end of the set time for turning off the heating source 10, resulting first in a pressure fall in the chamber 4 which operates the valve 5 on the cover 2 to close the steam passage so that the steam can be confined in the chamber 4. In this manner, the food A in the chamber 3 is allowed to be steamed with an adequate amount of steam, and is thus finally softened to a desired degree. It should be noted that the inner cover 2 or container 41 aids in holding the heat in the chamber 3 after the pressure cooking has been completed.

Although the invention has been illustrated with reference to several preferred embodiments thereof, it should be understood that various changes and modifications may be made without departing from the spirit and scope of the invention.

What is claimed is:

1. A two-staged pressure cooking apparatus comprising:

a vessel having a closed bottom and an open top;
   upper lid means removably sealed onto said vessel for closing said top thereof and for sealing the interior of said vessel in a pressure-tight manner;
   lower lid means positioned within said vessel and extending across said vessel at a location for dividing said interior of said vessel into a lower chamber to receive therein water and an upper chamber separate from said lower chamber and to contain food to be cooked;
   heating means mounted adjacent said lower chamber, for heating, water contained therein to its boiling point, thereby generating steam, the pressure of which builds up in said lower chamber;
   first pressure regulating means in said lower lid means for, when the pressure of said steam in said lower chamber builds up to a predetermined level, passing said steam from said lower chamber through said lower lid means and into said upper chamber, whereby food in said upper chamber will be cooked by said steam;
   first safety relief valve means, in said lower lid means at a position spaced from said first pressure regulating means, for preventing said pressure in said lower chamber from building up to an abnormally excessive and dangerous level;
   second pressure regulating means in said upper lid means for, when the pressure of said steam in said upper chamber builds up to a predetermined level, venting said steam from said upper chamber through said upper lid means to the atmosphere; and
   second safety relief valve means, in said upper lid means at a position spaced from said second pressure regulating means, for preventing said pressure in said upper chamber from building up to an abnormally excessive and dangerous level.

2. An apparatus as claimed in claim 1, further comprising apertured plate means, removably mounted in a lower portion of said upper chamber, for receiving and supporting food to be cooked.

3. An apparatus as claimed in claim 1, further comprising heating means, mounted in said bottom of said vessel at a position below said lower chamber, for supplying heat to said lower chamber.

4. An apparatus as claimed in claim 1, wherein said lower lid means comprises a dome-shaped cover integrally formed with said vessel.

5. An apparatus as claimed in claim 1, wherein said lower lid means comprises an inverted cup-shaped cover removably positioned within said vessel.

6. An apparatus as claimed in claim 1, wherein said first and second pressure regulating means each comprise a pressure-actuated regulating valve.

7. An apparatus as claimed in claim 6, wherein each said pressure-actuating regulating valve comprises a cup-shaped weighted valve covering an opening in the respective said lid means, said cup-shaped weighted valve being floatable under steam pressure to allow steam to pass therethrough.

8. An apparatus as claimed in claim 6, wherein each said pressure-actuated regulating valve comprises a ball-type valve including a casing having a threaded base threaded into the respective said lid means, a steam inlet opening in said casing, a floatable ball positioned within said casing over said steam inlet opening, and steam outlet apertures in said casing for allowing steam to pass therethrough.

9. An apparatus as claimed in claim 6, wherein each said pressure-actuated regulating valve comprises a piston-type valve including an elongated casing, a steam inlet opening in said casing, a floatable piston positioned within said casing over said steam inlet opening, and steam outlet apertures in said casing for allowing steam to pass therethrough.

* * * * *